COATING EACH OF A PLURALITY OF VACUUM TUBES HAVING HYDROGEN-PERMEABLE METAL SHELLS CONTAINING GETTERING MATERIAL, ELECTRON-EMISSIVE CATHODES, ACCELERATOR ELECTRODES AND COLLECTOR ELECTRODES, BASES AND EXTERNAL PRONGS CONNECTED WITH THE ELECTRODES, THE COATING (EPOXY-RESIN) BEING HYDROGEN-IMPERMEABLE AND LEAVING A HYDROGEN-PERMEABLE WINDOW ON EACH SHELL.

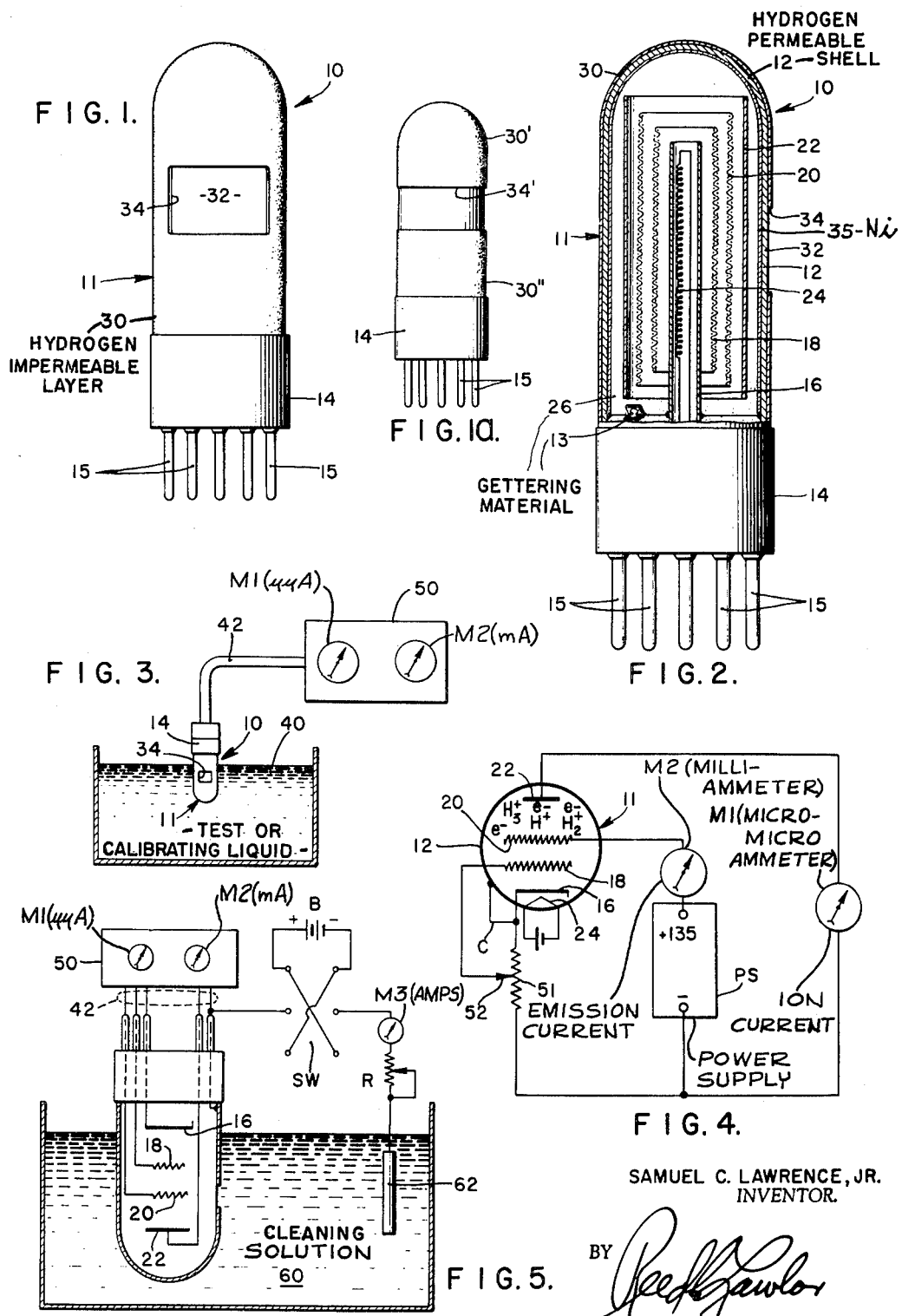

IONIZING HYDROGEN WITHIN EACH SHELL BY ENERGIZING ELECTRODES WITHIN THE SHELL.

INVERT AND IMMERSE EACH TUBE SHELL IN CLEANING SOLUTION (e.g. $MgSO_4$ -- $H_2SO_4$) HAVING A POLARIZING ELECTRODE, TO COVER WINDOW AND ANODICALLY PICKLE AND CLEAN WINDOW. REMOVE AND WASH.

INVERT EACH TUBE AND IMMERSE TO COVER WINDOW IN CALIBRATING SOLUTION OF NaOH OR OTHER BASIC ELECTROLYTE OR WEAK ACIDS OR NEUTRAL SOLUTIONS OF KNOWN HYDROGEN-EFFUSION CHARACTERISTICS. REMOVE AND WASH; SPRAY WITH ACETONE.

ADJUST WINDOW AREAS TO PROVIDE UNIFORM PERMEATION CHARACTERISTICS OF ALL TUBES TESTED.

IMMERSE WINDOW OF EACH INVERTED TUBE SUCCESSIVELY IN AS MANY TEST SOLUTIONS AS ARE TO BE TESTED.

MEASURE RATE AT WHICH ION CURRENT CHANGES DURING IMMERSION.

FIG. 6.

3,258,683
METHOD AND APPARATUS FOR DETECTION AND MEASUREMENT OF HYDROGEN-EFFUSION PROPERTIES OF FLUIDS
Samuel C. Lawrence, Jr., 1814 S. 142nd Place, Seattle, Wash.
Filed May 13, 1965, Ser. No. 455,558
28 Claims. (Cl. 324—33)

This application is a continuation-in-part of my parent application Serial No. 80,912, now abandoned.

This invention relates to improvements in electron discharge devices in the form of vacuum tubes employed for measuring the effusion of hydrogen from a fluid into a solid object. In this invention, greater uniformity of the characteristics of a set of the tubes is obtained by coating portions of the tubes with hydrogen-impermeable material, thereby leaving hydrogen-permeable windows in restricted areas of the tube surfaces.

It is well known that many metals, especially steel, are embrittled by virtue of hydrogen contained in them. The phenomenon resulting in such embrittlement is known as hydrogen embrittlement. Whether such gas is present in molecular form or atomic form or both is still undetermined. Though there may be some question as to the form in which the hydrogen exists in the metal, the hydrogen that is present there may be referred to as dissolved or absorbed hydrogen.

Hydrogen that causes embrittlement of metal may enter the metal in various ways. For example, hydrogen may enter a piece of metal while the surface of the metal is being cleaned with a paint solvent. Hydrogen responsible for embrittlement may also enter metal during the course of oxidation of the metal surface that occurs while the metal is exposed to a humid atmosphere for a prolonged period. Such embrittlement reduces the strength and hence the life of any object made from such metals as steel.

The rate at which hydrogen can diffuse from a fluid into a metallic object can be measured to some degree of accuracy by submerging an electron discharge device, often referred to hereinafter simply as a tube, or vacuum tube, or electron discharge tube, or electronic tube, in the body of the fluid and then determining the effect that such immersion has on the electronic characteristics of the tube. Phenomena of these types have previously been reported. See, for example, "Diffusion of Hydrogen From Water Through Steel" by Francis J. Norton, Journal of Applied Physics, vol. 11, pp. 262 ff, April 1940. See also United States Patent No. 2,526,038, issued to Herbert Nelson; United States Patent No. 2,790,324, issued to Maynard A. Babb; and United States Patent No. 2,921,210, issued to Edward Schaschl et al.

In such prior art devices, the electronic tube has been in the form of a diode, a triode, or a tetrode. Regardless of differences in structure between tubes, in accordance with the accepted theory of operation, the partial pressure of hydrogen within the envelope of the tube is increased while the tube is immersed in the fluid under investigation. This increase in pressure may be attributed to the migration of hydrogen ions through the wall of the tube shell to the interior surface thereof where the hydrogen ions combine with electrons in the tube wall to form hydrogen gas. The rate of diffusion depends not only on the diffusion and desorption characteristics of the wall but also upon the effusion properties of the fluid in which the tube is immersed. Since the effusion property depends upon the fact that the fluid is in contact with the wall of a metal object, it is sometimes referred to hereinafter as the hydrogen-effusion-into-metal characteristic of the fluid.

In making tests with a series of such electron discharge tubes, it has been observed that the sensitivity varies widely from one tube to another. As a result, the measurements obtained heretofore have been very erratic.

I have discovered that a large portion of the variation in the characteristics of one tube from those of another can be greatly reduced by coating a part of the shell with a material that is impermeable to hydrogen, leaving a predetermined portion of the shell which is not so coated and which therefore forms a hydrogen-permeable window. In accordance with this invention, a series of electron discharge devices, such as 6V6 tubes, or even specially made tubes, that have homogeneous shells, such as shells made of steel, are employed for this purpose. Even though the sensitivity of such tubes varies substantially from one tube to another prior to coating, it is found that the sensitivities can be equalized by forming hydrogen-permeable windows on their surfaces by coating the remainder of their surfaces externally with a coating material that forms a hydrogen barrier. In an alternative embodiment of the invention, the entire tube may be coated and the coating made thinner in the area that is to act as the window.

The forming of windows of predetermined area by coating such tubes not only has the advantage of making it possible to obtain comparative measurements with a series of tubes, but also improves the reliability of a single tube. For example, by partially coating a tube in accordance with this invention to form a window of predetermined area, reliable and reproducible measurements may be obtained with a single tube by immersing only the shell of the tube in a liquid under investigation while holding the base of the tube, and the seal between the base and the shell above the surface of the liquid. In practice the coating covers the outer surface of the shell between the window and the base of the tube. When the tube is so supported in the liquid, the hydrogen flows into the tube from the liquid through a predetermined area of the shell. By virtue of the fact that the window is immersed in the liquid beneath the upper surface of the tube, errors that might otherwise arise because of agitation of the surface of the liquid or because of evaporation of the liquid or because of the atmosphere above the surface of the liquid, are avoided.

For best effects, vacuum tubes are employed which have been evacuated by conventional techniques under which the envelopes are sealed against the atmosphere and then gettering material is evaporated onto a portion of the interior wall of the shell in order to absorb residual gas that otherwise might be present within the envelope. Such gettering material not only removes residual gases remaining in the tube when it is initially manufactured, but also performs the additional function of removing the hydrogen that enters the tube in the practice of this invention. In this way the calibration of the tube is stabilized, thus increasing the utility of forming windows to establish the sensitivity at a predetermined value. Furthermore, when using a tube including such gettering material, hydrogen and other gas are easily removed without the necessity of resorting to the use of pumping systems.

I have found that most efficient operation can be obtained by coating the shells with hydrogen-impermeable material over the areas of the envelopes opposite the deposits of gettering material that coat portions of the inside walls of such envelopes. In this way windows are formed opposite the portions of the envelope which are free of gettering material.

By forming such windows opposite the portions of the envelopes that are relatively free of deposits of gettering material, a high degree of uniformity of sensitivity of tubes may be achieved, even though the windows are all of the same size. But in cases where differences in sensitivity still remain, compensation for such variations in sensitivity from one tube to another is made by removing a small amount of coating material or by adding a small amount of coating material, thus altering the areas of the windows of the respective tubes. Alternatively, the thickness of the coating in the window area may be varied. In this way, the sensitivities of the tubes in a given set of tubes can be equalized. Such equalization of sensitivity is very important, since the tubes have limited lives and must be replaced at rather frequent intervals. By manufacturing tubes which have uniform sensitivity, more nearly comparative results may be obtained when a series of tubes are employed for measuring hydrogen diffusion from fluids under otherwise uniform conditions. Similarly, by use of tubes of equal sensitivities, differences in the hydrogen effusion properties of different fluids, or of the same fluid under different conditions, may be determined more reliably.

Under some circumstances it may not be desirable to equalize the sensitivities of a series of tubes. In this case, the sensitivity of each tube is measured, and account of the differences in sensitivities is taken in the determination of the hydrogen effusion properties of liquids being tested. A tube employing the invention is sometimes referred to hereinafter as a hydrogen probe or hydrogen detector.

The invention possesses other features and advantages in addition to the foregoing, as will be apparent from a reading of the following specification, taken in connection with the accompanying drawing, wherein:

FIGURE 1 is an elevational view of a hydrogen probe embodying this invention;

FIG. 1a is an elevational view showing a modified window arrangement;

FIG. 2 is a longitudinal partial section of the probe of FIG. 1;

FIG. 3 is a diagram employed to explain one way of utilizing the invention;

FIG. 4 is a schematic diagram of a circuit employed for making measurements of hydrogen diffusion rate by means of this invention;

FIG. 5 is a schematic diagram of a calibrating system employed in this invention; and FIG. 6 is a flow sheet of a method employed in this invention.

In FIGS. 1 and 2, there is shown a vacuum tube 10 which is a 6V6 vacuum tube that has been modified in accordance with the present invention. This vacuum tube is provided with an envelope 11 which comprises a metal shell 12 sealed to an insulating base 14. The shell 12 is formed of a metal such as steel which is permeable to hydrogen. Such a tube comprises an indirectly heated cathode 16, inner and outer grids 18 and 20, and a plate 22. All of the electrodes are of cylindrical configuration and they are supported concentrically within the envelope 11. Each of the electrodes 16, 18, 20 and 22 and the shell 12 is connected electrically with an external metallic prong-shaped terminal 15. The two terminals of the heater 24 mounted in contact with the cathode 16 are also electrically connected to two external terminal prongs.

In the conventional method of manufacturing such a tube, the envelope 11 is evacuated by means of a vacuum pump and then sealed off against the ingress of air. At the time of sealing, the pressure within the envelope may be about $10^{-2}$ or $10^{-4}$ mm. Hg. In order to improve the operation of such a tube, the interior space is further evacuated by the evaporation of a charge 13 of gettering material within the envelope. Such a gettering material may, for example, consist of barium salts in combination with salts of aluminum or beryllium which when evaporated (flashed) produce free barium, or other material capable of absorbing residual gas remaining in the envelope after sealing. Upon evaporation, such gettering material forms a localized deposit on the interior wall of the tube, such as the deposit 26 shown at the lower end of the tube 10 of FIG. 2.

As is well known, such gettering material absorbs residual gases contained within the envelope of such a vacuum tube, thereby reducing the gas pressure to a much lower value, such as to a pressure of $10^{-7}$ mm. Hg. In some cases, the deposit of gettering material is at the upper end of the tube, instead of at the lower end, as shown. In other cases, the deposit of gettering material is on the side of the tube. In any event, during the course of manufacture of a series of tubes, the area covered by the deposit 26 of gettering material varies in a rather irregular manner from one tube to another. On the other hand, it is also possible to produce such high vacuums with special pumps or with getters that operate only when turned on—as with special auxiliary filaments. In such cases, the masking of gettering deposit on the tube surface is not necessary, but windows to control differences in gas permeation rates due to variations in shell structure or composition are required in order to give satisfactory results.

In accordance with the present invention, the outer wall of the shell 12 is coated with a hydrogen-impermeable layer 30 over a portion of the external surface thereof, but leaving a restricted portion 32 of the shell free of such coating material, thus forming a hydrogen-permeable, or hydrogen-pervious, window 34. The layer on the coated portion of the shell thus forms a barrier to the flow of hydrogen into the interior of the tube, while the uncoated portion forms a hydrogen-permeable window which permits the flow of hydrogen into the interior of the tube through the window 34. It is to be noted that in both embodiments of the invention illustrated in FIGS. 1 and 1a between the windows 34 and 34' the hydrogen-impermeable material encircles the shell and the base 14.

In the best embodiment of the invention, the portion of the shell 12 opposite the deposit 26 of gettering material is coated with hydrogen-impermeable material, thereby locating the window 34 in an area of the shell which is free of gettering material, or at least has only a small proportion of gettering material deposited thereon. In this way, maximum hydrogen permeability is achieved for a window of given size. Furthermore, irregular absorption of hydrogen by the gettering material that would otherwise occur if the hydrogen flowed through a portion of the shell opposite the coating 26 of gettering material is avoided. This not only makes is possible to form windows having predetermined hydrogen permeation characteristics in a series of tubes, but also preserves the life of the gettering material so that its gaseous absorption properties are preserved for a longer period. In this way, the gettering material is available for absorbing hydrogen gas from the space within the tube. In this connection, it will be understood that the hydrogen-gaseous atmosphere developed within the interior of the envelope due to the flow of hydrogen through the window 34 is gradually absorbed by the gettering material 26, until the gettering material has become saturated with hydrogen, or in other words, until the hydrogen absorption ability of the gettering material has been greatly reduced or exhausted.

It is not necessary for the window to have a rectangular shape as shown in FIG. 1. The window may have any other suitable shape and may, for example, be in the form of a cylindrical area 34' located between two areas 30' and 30" which have been coated with hydrogen impervious material as illustrated, for example, in FIG. 1a. In the latter case, for example, when using a 6V6 tube which has a shell diameter of 1 inch and a shell height of approximately 2 inches, the lower ¾ inch of the shell and the upper ½ inch of the shell are coated with hydrogen impervious material thus leaving a cylindrical strip of about ¾ inch height which acts as a cylindrical window having an area of about 2 square inches. In some cases, especially when there is no gettering material at the outer, or upper, end of the shell, coating material may be applied only to the portion of the shell that is adjacent the base.

There are a number of materials, such as natural or synthetic resins, which are impervious to hydrogen and which may be readily applied in the form of solutions by painting them onto the surface of the envelope 12, or by dipping, or by spraying. In the case of dipping or spraying, the desired area for the windows 34 and 34' may be conveniently masked, as by means of an adhesive masking tape useful for the purpose. For example, "chemical masking tape" may be used for this purpose during dipping. If such material is used, it is removed prior to use of the tube as a probe.

The well-known epoxy resins, in solution form or in other appropriate liquid form, are useful for the indicated purpose, as are other known synthetic resins in solution or other satisfactory liquid form, such as the well-known vinyl paints which need not be baked. Other coating materials are baking-type black lacquer and so on.

An epoxy resin suitable for use in making a window with this invention is the epoxy resin known as Shell 1001. This resin has an epoxy equivalent of 500, that is, it has 500 epoxy groups per mole. To prepare such an epoxy resin for use as a coating material it is dissolved in a suitable solvent such as butyl alcohol, butyl "Cellosolve," xylene, or toluene, or compatible mixtures thereof. Pigments may be added in order to color the tubes. Prior to application of such coating material a suitable catalyst is added for accelerating the hardening of the coating when it is applied. A tertiary amine adduct made from Shell 1001 and containing free amine groups is a suitable catalyst. After coating the probe the resin is normally cured for 3 hours at 300° F. Likewise when small quantities are applied to the edges of a window in order to alter the size of the window, it is cured by baking for 3 hours at 300° F. Such a coating is able to withstand temperatures of 350° F. for 72 hours without discoloring, peeling or otherwise deteriorating.

From the standpoint of the inner layer 26 of gettering material, barium is a common and satisfactory gettering agent, as are many other known materials. Since the tubes to be used for this purpose, such as the well-known 6V6 tubes, are commonly purchased on the market, they are used with such gettering materials as they may carry.

From the standpoint of the metal shell 12, any of the well-known hydrogen-permeable metals may be employed, such as platinum, palladium, and others well known because of their hydrogen-permeable characteristics. Palladium appears to be the most satisfactory metal for the indicated purpose, but others are usable such as iridium, ruthenium, osmium, and rhodium. For many purposes, however, it is satisfactory and more economical to employ commercially available 6V6 tubes which have shells that are made of steel. By employing such commercially available tubes and by forming hydrogen-permeable windows in them, a series of tubes having uniform hydrogen sensitivities may be readily produced economically, even though the permeability of the unwindowed shells to hydrogen may vary from tube to tube.

In FIG. 3, there is shown schematically an arrangement for measuring the hydrogen effusion properties of a liquid. In this case, the end of the shell 12 of the probe 10 is located beneath the main level 40 of the liquid under investigation, while the insulating base 14 is located above that surface. It will be noted that the portion of the shell is coated with hydrogen-impermeable material both above and below the surface of the liquid. An electric cable 42 into which the terminals 15 have been plugged connects the probe 10 with a measuring circuit 50. This circuit 50 includes a first meter $M_1$ for measuring a characteristic of the tube 10 that depends upon the amount of hydrogen that has flowed into the space within the envelope of the tube through the window 34, and a second meter $M_2$ that is used for standardizing the electron emission of the cathode.

By making measurements of the hydrogen effusion properties of different liquids, information is thus obtained for monitoring the operations of a system in which metallic objects are treated with such liquids. By use of such a tube, liquids which have the lowest hydrogen-effusion-into-metal characteristics may be selected. Any hydrogen embrittlement of metallic objects treated by liquids can thus be minimized. For example, a series of tubes of equal sensitivity may all be painted with a common paint that is to be removed. Then each of these tubes may be partially submerged in a different liquid paint remover in the manner just described and the effect of the different paint removers on the different characteristics of the respective tubes measured. In this way, the differences in the hydrogen diffusion properties of the different paint removers may be ascertained. For best effects, the tests are all made at the same temperature. It has been found useful to use as coating materials paints that have been cured at higher temperatures and for longer times than those paints being monitored in their reactions with paint strippers. Such highly cured paints can be made non-reactive to the stripper under test—by proper cure procedure—and are in addition non-permeable to hydrogen. Methods for measuring hydrogen effusion properties of paint removers and other liquids have been described and claimed in my co-pending patent application Serial No. 94,202, filed on March 8, 1961, under the title Paint Stripping System.

A measuring circuit of the type that may be employed for measuring the pressure of the hydrogen atmosphere formed within the envelope 11 of the tube of this invention is shown in FIG. 4. As indicated there, the cathode 16 is connected to one end of a potentiometer 51, the other end of which is connected to the negative terminal of a power supply PS. The inner grid 18 is connected to the slide wire 52 of the potentiometer. The outer grid 20 is connected through a meter $M_2$ to the positive terminal of the power supply PS, and the plane 22 is connected through a micro-microammeter $M_1$ to the negative terminal of the power supply PS. The voltage supplied by the power supply PS is of such a magnitude that electrons accelerated from the cathode 16 toward the plate 22 attain energies corresponding to those above the ionization potential of molecular hydrogen. In use the shell 12 is connected to the cathode 16.

The outer screen 20 is employed as an accelerator electrode. The plate 22 is employed as a positive charge collector, or positive ion collector. The inner grid 18 is employed for regulating the electron current formed within the tube under standard conditions. By manipulating the slider 52 on the potentiometer 51, the current flowing through the tube at any time may be standardized, thus compensating for differences in the electron emissive properties of cathodes 16 of different tubes, or for compensating for differences in the electron emissive properties of the cathode of any tube during the life of the tube. The effectiveness of the inner grid for this purpose arises from the fact that the 6V6 tube has a gradual, or remote, cut-off characteristic as distinguished from a sharp cut-off characteristic thus permitting a gradual change of current to be produced when the bias on the inner grid 18 relative to the cathode 16 is changed. The bias on the emission control grid may also be adjusted when the probe is in use in order to adjust its sensitivity. Over a wide range of operation the ion current indicated by meter $M_1$ is proportional to the emission current indicated by meter $M_2$. While the meter $M_1$ is indicated to be a micro-microammeter and the meter $M_2$ is indicated to be a milliammeter, it will be understood, of course, that the meters may be of any suitable type having sensitivities adequate for measuring current in the ranges of operation of the tube.

In operation, hydrogen effusing from the liquid diffuses through the window 34 of the tube 10 to the inner surface thereof. At the inner surface the hydrogen is desorbed thus increasing the pressure of hydrogen gas existing within the envelope 11. As mentioned above, the hydrogen may flow through the wall in the form of a positive ion current, combining somehow with electrons on the inner surface of the envelope, thereby forming atomic hydrogen. Such atoms of hydrogen then combine within the envelope, probably at the surface, to form molecular hydrogen which thereby establishes a molecular hydrogen atmosphere within the envelope. Regardless of the explanation of the phenomena involved, the fact is that the pressure of hydrogen gas within the envelope is increased when the tube is immersed in a liquid which is capable of causing such permeation of hydrogen into the envelope. By locating the window at a distance from the gettering material, direct absorption of hydrogen by gettering material as the hydrogen diffuses through the shell is avoided. Instead, the hydrogen is desorbed rapidly from the portion of the wall free of gettering material, thus maximizing the rate of flow of hydrogen into the space within the probe envelope.

In the process of accelerating electrons from the cathode 16 toward the accelerator grid 20, electrons travel at a high speed through the space between the cathode 16 and the accelerator grid 20. Thereafter, they are decelerated in the space between the accelerator grid 20 and the collector plate 22. Electrons bombard hydrogan in the space between the accelerator grid 20 and the plate 22 thereby ionizing the hydrogen gas. As a result, electrons represented by the symbol $e^-$ and hydrogen ions represented by the symbols $H^+$ and $H_2^+$ and $H_3^+$ are formed in the space within the envelope between the accelerator grid 20 and the collector plate 22. Such hydrogen ions, being positively charged, are repelled by the accelerator grid 20 toward the collector plate 22. When they strike the collector plate, they collect their missing electrons which therefore flow through the micro-microammeter $M_1$. At the same time, electrons formed in the ionization process are drawn toward the accelerator grid 20. These electrons flow to the positive terminal of the power supply. Hydrogen ions and electrons are also formed in the space between the two grids by virtue of the bombardment of hydrogen gas in this region by the accelerated electrons. These hydrogen ions flow to the inner grid 18, where they are discharged, and these electrons flow to the outer grid 20. The latter hydrogen ions and electrons do not contribute to the current flowing through the micro-microammeter $M_1$.

In practice, therefore, the magnitude of the current flowing through the meter $M_1$ is a measure of the pressure of hydrogen gas present within the envelope 11 at any time. In practice, it is observed that when a probe 10 exposed to fluid is first turned on, the magnitude of the current flowing through the meter $M_1$ changes as a function of time. For this reason, measurements are made after the current has become stabilized, or else has fallen below some predetermined value. Then the probe is immersed in the fluid under test and the rate at which the ion current increases is measured while the probe is exposed to the fluid.

In normal usage, when a probe is first energized the ion current rises rapidly to a high peak value which may exceed $10^{-7}$ amp. This current arises from the fact that the initial heating of the probe, especially the initial heating of the cathode causes some of the gases that have previously been adsorbed on various electrodes and the internal surface of the shell to be desorbed. While the probe remains warm these gases are adsorbed or absorbed by the gettering material gradually reducing the ion current to a value of $4 \times 10^{-9}$ amp. or less. The time required for the ion current to reach such a sufficiently low value to permit subsequent significant measurements to be made varies between 10 to 30 minutes, if the tube has once been previously properly prepared.

In any event, by means of this invention, variations in readings that would otherwise occur because of the differences between uncoated tubes can be greatly reduced. When a probe is not in use, the hydrogen gas within the tube becomes absorbed by the gettering material, thus restoring the probe to its normal quiescent low pressure condition. When so restored, the tube may be used again. However, when the hydrogen absorption capacity of the getter has been exhausted, as when the gettering material becomes saturated with hydrogen, the pressure of the hydrogen atmosphere remains high and the tube calibration is altered, thus requiring replacement of the tube.

As mentioned above, when using the same probe to measure the effusion properties of a series of liquids the tube is cleaned up between tests to remove hydrogen gas from the space within the envelope. This is most easily done by maintaining the probe at an elevated temperature between tests. In the simplest way of performing this operation the probe is connected with a power supply which energizes the various electrodes including the cathode. Unless the probe is heated to remove hydrogen the gettering process would require 24 hours or longer to be reasonably effective. By heating the probe during the clean-up process the gettering action is accelerated thus making it possible to prepare the tube for reoperation within a short period of about 30 minutes under ordinary usage. In case a conventional commercial 6V6 is employed as a probe the temperature of the tube is maintained at an elevated temperature below about 190° C. during the clean-up process. The reason for this is that commercial 6V6 tubes generally employ barium as the gettering material and barium desorbs hydrogen and other gases above about 200° C.

Inasmuch as tubes in accordance with this improvement are used for test purposes, and since test results must be of uniformly repeatable accuracy, it is necessary that all tubes produced for these purposes must possess a predetermined standard of permeability and sensitivity. Therefore, in preparing a coated tube carrying, for example, a layer of the hydrogen-impermeable epoxy resin, it is tested under standard conditions to be sure it has the required degree of hydrogen-permeability. If it is found that the tube, when in a standard fluid having known or standard effusion properties, permits the permeation of too much hydrogen, then additional resin is applied to reduce the size of the window 34 to a satisfactory degree. In such a manner, all tubes are coated and brought to the required indicated standard of sensitivity or permeability. Even removal of a portion of coating already applied constitutes an acceptable method for regulating the size of the window 34 for the various tubes under manufacture.

In some cases where the hydrogen effusion property of the liquid under investigation is exceptionally high, it is desirable to limit the rate of permeation of hydrogen into the envelope to such a value that the pressure of the hydrogen atmosphere within the envelope is maintained at a sufficiently low value to permit reliable measurements to be made. In this connection, it is to be borne in mind that when the pressure of the hydrogen atmosphere within the envelope becomes exceedingly high, such as above $10^{-3}$ mm. Hg, the tube will become inoperative. For this reason, it is desirable to prevent the pressure of the hydrogen atmosphere from attaining such a high value. More particularly, it is desirable to maintain the pressure in a 6V6 tube below about $10^{-3}$ mm. Hg during operation.

The presence of excessive flow rates may be ascertained by measuring the ion collector current as a function of time and noting whether saturation is avoided within a period of time during which measurements are to be made. In this connection, for example, it is generally desirable to make a measurement of the current at some predetermined time after the tube has been immersed in the liquid under test, since, as mentioned above, the ion collector current generally increases gradually until the hydrogen pressure attains a value at which the rate of influx of hydrogen through the window equals the rate of absorption of hydrogen by the gettering material.

The rate of permeation of hydrogen through the shell may be limited in two ways. In one, the window 34 is made very small. In the other, the entire shell is coated with a layer of hydrogen-impermeable material. This material may, for example, be a coating of nickel that has been deposited on the surface of the shell during the manufacture of the tube. In this connection, it is better to deposit such a layer 35 of nickel on the interior surface of the shell rather than the outer surface of the shell, so that, where desired, the outer surface chemistry will be identical for all given tube types and they may be treated as in the manner described below to remove impurities that affect hydrogen from the outer surface. Instead of nickel other metals having low hydrogen diffusion rates compared with the hydrogen diffusion rate of the main body of the shell may be employed. Thus, where the main body of the shell is made of steel, the interior of the shell may be coated with nickel, aluminum, or copper to reduce the permeability of the window. Though the nickel layer may coat the entire internal surface of the tube as mentioned above, the attenuating effect on the hydrogen permeation of the tube could also be attained by coating the internal surface of the tube with nickel over a restricted area and then forming the window opposite that restricted area.

From the standpoint of the preparation of the metal surface of the shell 12, either for proper diffusion of the gases, or for application of the hydrogen-impermeable resin, the metal tube is adequately cleaned to remove any paint coat which may have been applied by the manufacturer, or to remove oxidation products, or the like.

This cleaning process may include fine sand blasting, electropolishing for a few minutes with sulphuric acid, glycerol solution, water rinsing, and a 5-second dip in a 6% hydrochloric acid solution to brighten and activate the metal surface, all followed by a distilled water rinsing, followed by acetone rinsing or spraying. In these operations, the tube base 14 and the joint between the base and the metal shell 12 are supported above the level of the cleaning solution.

Following coating of the desired proportion of the envelope with the desired impervious resin, the latter is heat-cured or otherwise suitably cured. If, on test, after curing, too much resin is found to have been applied, appropriate portions may be stripped away or otherwise suitably removed.

In the best method of forming windows in a series of standard 6V6 tubes, now known, the tubes are prepared in accordance with the following procedure:

*Step 1.*—The paint and heavy oxide scale is removed by sandblasting the outer surface of the shell.

*Step 2.*—The exterior nickel plate is removed from the shell by electropolishing as described above.

*Step 3.*—The tube shell is sandblasted again.

*Step 4.*—Using a chemical masking tape in combination with a vinyl paint for the end of the tube a window is prepared thusly. The top ½ inch of the tube is masked and the lower ¾ inch of the tube metal shell is masked leaving a window ¾ inch high circumferentially around the tube.

*Step 5.*—The tube is connected to the measuring circuit 50 and the electron emission current adjusted to 5 milliamperes as measured with the meter $M_2$.

*Step 6.*—The tube shell is made anodic and the tube is immersed in a magnesium sulphate-sulphuric acid pickle 60. The pickling current is set at 2 amps. Anodic pickling is continued for 50 seconds. To make the shell anodic, the shell is connected to the plus terminal of a battery B and the negative terminal is connected through an ammeter $M_3$ to a cathode 62 submerged in the pickling bath 60 as illustrated in FIG. 5.

*Step 7.*—The tube is then removed from the pickling bath and is rapidly sprayed with warm water to remove traces of acid.

*Step 8.*—The tube is then dipped into hot (150° F.) water. Steps 7 and 8 should take 10 seconds total together. The tube ion current normally should read approximately $10 \times 10^{-9}$ amps. following step 8.

*Step 9.*—The tube is then removed from the hot water and placed in a calibrating solution of sodium hydroxide at 72° F. The concentration of the sodium solution is 15 grams of sodium hydroxide per liter of solution. This solution has a predetermined hydrogen effusion rate.

*Step 10.*—When the ion current has decreased to $4 \times 10^{-9}$ amps., the tube shell is made cathodic with a current density of 0.8 amp. with respect to a graphite or gold anode. The time necessary for the ion current to again reach $10 \times 10^{-9}$ amps. while this cathodic current is applied is determined. At this time, the charging current is turned off and the time required for the ion current to again reach $4 \times 10^{-9}$ amps. is measured. Typical times are about 2 minutes and about 20 minutes, respectively.

*Step 11.*—The tube is then removed from the bath and is again spray-rinsed with warm water.

*Step 12.*—If the hydrogen permeation rate observed, as measured by the time required for the ion current to change from $4 \times 10^{-9}$ amps. to $10 \times 10^{-9}$ amps. in step 10, is 10% too great the window area is decreased by 10%, and conversely, if it were too little, the window area is increased proportionately. The area of a window is adjusted by painting the edges of the windows or by removing paint from the edges as previously described.

Steps 10 and 11 are then repeated if necessary. The measurement obtained in the last performance of step 10 represents the calibration of the probe.

*Step 13.*—After the calibration has been satisfactorily achieved, the probe is rinsed in distilled water and is then sprayed with acetone in order to remove residual water. By removing residual water from the tube after it has been thus calibrated, the danger of rusting or corrosion of the tube prior to its subsequent use in measuring a fluid under test is greatly reduced.

In carrying out the foregoing steps, it is to be noted that certain of the steps, especially step 6 and those associated therewith, are employed for cleaning the external surface of the tube shell. Other steps, especially step 10 and those associated therewith, relate to the calibration of the tube. The best solution to employ for cleaning the external surface is a strong acid. However, the best solution to employ for calibration is a weak acid, a neutral solution or an alkaline solution. Potassium hydroxide may be employed in place of sodium hydroxide as a calibrating solution. Even water of known purity may be employed for calibration. In any event, however, strong acids are avoided during the calibration step because of the fact that they react rapidly with the outer surface of the tube. The anodic pickling cleaning process employed above is also known as an electrochemical cleaning process. By employing an anodic electrochemical cleaning process, permeation of the probe by hydrogen is avoided during cleaning.

It will be noted that the tube shell can be made either cathodic or anodic with respect to the graphite or gold polarizing electrode by manipulation of the reversing switch SW of FIG. 5. It will also be noted that the current flowing to or from the tube shell can be regulated by adjustment of the rheostat R which is connected between the switch SW and the polarizing electrode 62. It will be understood, of course, that this electrode acts as an anode when the tube shell acts as a cathode and acts as a cathode when the tube shell acts as an anode.

Where it is desired to attain a high degree of uniformity, especially when the hydrogen permeability of a tube differs from a standard value by more than about 25%, steps 9 to 12 are repeated as many times as necessary to attain the desired accuracy.

The importance of standardizing the sensitivities by adjusting the window size can be appreciated from the fact that if this is not done, windows of equal sizes and sensitivity of different commercial tubes from the same source may extend over a range of 10 to 1. In some cases, instead of equalizing the sensitivity of the tubes by adjusting the window areas as described, the tubes are marked with indications of their respective sensitivities and account is taken of these sensitivities in determining the hydrogen effusion properties of fluids under investigation. In any event, by use of a probe on which a window has been formed as described, reliable measurements can be made by submerging the portion of the tube that has the window in the liquid under investigation while supporting the base of the tube and the adjacent portion of the shell above the level of the liquid.

In the above manner, each tube may be appropriately cleaned and painted or otherwise coated so that all tubes possess the desired standard of sensitivity or hydrogen permeability.

Probes made in accordance with this invention, may be employed in many different ways in order to determine the effusion properties of particular fluids and in the determination of the comparative effusion properties of different fluids. The following examples are representative.

*Example I*

In this case the comparative effusion properties of different concentrations of sulphuric acid were compared.

The probe is prepared for use in making measurements as follows:

*Step 1.*—The probe is connected in the measuring circuit 50 and the electron emission current is adjusted to 5 milliamperes as measured with the meter $M_2$. The probe is permitted to age until the collector current drops below $4 \times 10^{-9}$ amp.

*Step 2.*—The probe shell is then immersed in a magnesium sulphate-sulphuric acid pickle with the window located in the body of the pickle 60 as shown in FIG. 5. The tube shell is made anodic by appropriate setting of the switch SW and the pickling current is adjusted to 2 amps. Anodic pickling is thus continued for a sufficient time to remove oxides from the outer surface of the shell. Usually anodic pickling for one minute is sufficient.

*Step 3.*—The probe is then removed from the pickling bath and is rapidly sprayed with warm water to remove traces of the pickling solution.

*Step 4.*—The probe is then dipped into hot water.

*Step 5.*—The probe is then dried either with blotting paper or by spraying with acetone. The probe is then partially immersed in the liquid undergoing test so that the liquid covers the entire area of the window. The time required for the collector current to reach a predetermined selected value such as $10^{-7}$ amp. is then measured. With a particular probe, the following data was obtained:

TABLE I

| $H_2SO_4$ Concentration | Effusion Constant (Minutes to reach $10^{-7}$ amp.) |
|---|---|
| 0.01% | 90 |
| 0.1% | 10 |
| 1% | 1 |

In this table, the concentration of sulphuric acid is expressed in volume percent of solution. The effusion constant of the acid is expressed in terms of the number of minutes required for the collector current to reach $10^{-7}$ amp. It will be noted in this case that the product of the concentration by the effusion constant in minutes is about constant. In other words, in this particular case, the rate of effusion of hydrogen into the interior of the probe is directly proportional to the hydrogen-ion concentration of the sulphuric acid.

*Example II*

In this case the comparative effusion constants of different concentrations of nitric acid were determined. In this case, as previously, the probe was cleaned and was permitted to age until the current dropped below $4 \times 10^{-9}$ amp., then the probe was dried and partially submerged in various concentrations of nitric acid. In this case, the results obtained are shown in Table II:

TABLE II

| $HNO_3$ | Effusion Constant (Minutes to reach $10^{-7}$ amp.) |
|---|---|
| 0.02% | 3,000 |
| 0.2% | 150 |
| 2% | 5 |

Here it will be noted that the product of the concentration and the effusion constant is not about constant. The difference in the results obtained with sulphuric acid and with nitric acid can be explained on the basis of the creation of a passevation film on the window when the probe is submerged in nitric acid and the absence of such a passevation film when the probe is employed to test sulphuric acid.

*Example III*

In this example, comparative tests were made to determine the comparative effusion characteristics of a number of different strippers employed to strip a particular type of paint from a series of probes. To prepare the probes for such tests, they were first cleaned and dried as described in Example I above. Then the paint under investigation was applied over the window. Most conveniently, it was applied to the entire outer surface of the probe by dipping. The particular paint employed in this test was an epoxy resin. After the tube was coated with the paint it was cured for 24 hours at 80° F.

After coating each probe was plugged into its socket and energized and permitted to age until the collector current fell below $4 \times 10^{-9}$ amp. At this time the probe was immersed in the stripper to be tested as shown in FIG. 3, while the stripper was at 72° F. Representative results obtained with four different commercial strippers here designated by the letters A, B, C and D, are shown in Table III.

TABLE III

| Stripper | Effusion Constant (Minutes to reach $10^{-7}$ amp.) | Stripping Time | Total Effective Hydrogen |
|---|---|---|---|
| A | 15 minutes | 15 minutes | 1 |
| B | 40 hours | 2 hours | 1/20 |
| C | ∞ | 20 minutes | 0 |
| D | 1 minute | 30 minutes | 30 |

In column 1 the different strippers are identified. In column 2 the effusion constants measured as described above are tabulated. Note that in this case the current with commercial stripper C never did attain a value of $10^{-7}$ amp. over the period of measurement, which was many hours.

In column 3, the time required for the stripper to be effective in stripping the paint from the tube, was measured. This determination was made by visual observation of the window. In column 4, the comparative amounts of hydrogen that permeated the probe during the time required for the stripper to strip the entire coating from the probe window, has been computed. This computation has been made by dividing the stripping time by the effusion constant.

In practice, the total amount of hydrogen differs somewhat from the values thus calculated because of the getter action. Nevertheless, these values do represent a figure of merit for each of the strippers which can therefore be employed in selecting a stripper for the particular paint in question. Note that in the particular examples given commercial stripper C is excellent for the purpose; commercial stripper B is very good; but that commercial strippers A and D are not very satisfactory. As a practical matter, it is found that considerable hydrogen embrittlement can be caused by the use of commercial strippers A and D but that by using commercial strippers B and C, hydrogen embrittlement can be largely avoided.

*Example IV*

In this case tests were made to determine the hydrogen effusion property of the same chemical composition after it had been stored in different containers. The material investigated was methyl "Cellosolve." Different specimens of Cellosolve, that had been stored in different containers, were tested. In making these tests the probe was energized, cleaned and dried as described in Example I and then the probe was immersed in the solvent being tested while the solvent was at 72° F. In one case the solvent had been stored for over a month in a tin container. In the other case, it had been stored in a glass bottle.

In testing the solvent that had been stored in the glass bottle, no appreciable amount of hydrogen effusion was detected over a period of four hours, but in the case of the solvent that had been stored in a tin can, the collector current of the probe attained a value of $10^{-7}$ amp. within five minutes. From these tests, it was therefore determined that some methods of storing a normally inactive solvent, are superior to others so far as the hydrogen effusion properties of the solvent are concerned.

By storing solvents and other liquids used to clean, or otherwise treat steel in a way to reduce the hydrogen effusion constants of such liquids, hydrogen embrittlement of the steel can be greatly reduced or entirely eliminated.

In the foregoing discussion, the effusion properties of liquids have been expressed in terms of the time required for the ion current to attain a value of $10^{-7}$ amp. It will be understood, of course, that the time required to attain that value increases as the volumetric rate of effusion of hydrogen from the liquid decreases. The volumetric rate of effusion in this particular case can be calculated from the formula $$R = \frac{4 \times 10^{-11}}{T} \text{molecules per square centimeter per second}$$

where T equals the time required for the ion current to reach $10^{-7}$ amp. as measured in seconds.

The foregoing formula is calculated from the following facts which apply in this particular case.

(1) An ion current of $10^{-7}$ amp. corresponds to a gas pressure of $5 \times 10^{-6}$ mm. Hg, which in turn corresponds to $5 \times 10^{+12}$ hydrogen molecules, in the probe.

(2) The cross-sectional area of the window through which the hydrogen effuses is 12.5 cm.²

In this specification the terms "effusion," "diffusion," "permeation," and "desorption" have been employed to describe various phenomena that affect the flow of hydrogen from a body of liquid through the shell of a probe into the space within the shell. The effusion property refers to a property of the liquid. It represents the ability of the liquid to supply hydrogen to the external surface of a probe or to the external surface of a solid object that is immersed in a liquid. This ability may be due to electrical characteristics, chemical characteristics, or others. The term "diffusion" refers to the migration of hydrogen from one point to another within the material composing the shell of the probe or the object. The term "desorption" refers to the ability of a surface to cause hydrogen contained within the wall or within the object to emerge from the surface in gaseous form. The term "permeation" refers to the over-all ability of a wall member to permit the flow of gas through the wall from the space on one side thereof external to the wall to the space on the other side thereof external to the wall. It is thus seen that in the flow of hydrogen from the liquid under test into the space within the shell of the probe, the hydrogen effuses from the liquid through the external surface of the shell into the body of the shell. There the hydrogen diffuses to the internal surface of the shell. At this point the hydrogen is desorbed thereby forming a gaseous atmosphere within the shell. The permeability of the shell depends upon the diffusion characteristics of the shell material and also the desorption characteristics of the internal surface, and also on the nature of the interaction between the external surface and the fluid undergoing investigation.

While the probe of this invention may be used in many ways and with many circuits, it is clear from the foregoing description that a novel hydrogen detection system of greater reliability is provided. While the invention has been described with respect to only specific embodiments thereof, it will be understood by those skilled in the art that it may be applied in many other ways. For example, though the invention has been described as being applicable to a tetrode, some features may also be applied to triodes and even to diodes. Furthermore, while the invention has been described with specific reference to the most important application thereof known, namely, to the measurement of the hydrogen effusion characteristics of liquids in which a probe is immersed, it will be understood that the invention is also applicable where the tube is exposed to hydrogen-bearing atmospheres or to other gaseous fluids that may have hydrogen-effusion characteristics. It is, therefore, to be understood that the invention is not limited to the specific embodiments and applications thereof described, but that it may be embodied in many other forms, and that various other materials may be employed, and that it may be used with other circuits and in other environments than those specifically described herein.

The invention claimed is:

1. Apparatus for measuring hydrogen-effusion characteristics of a fluid material, including:

a vacuum tube having a hydrogen-permeable sealed envelope formed by a shell member of uniform composition over its area, said shell member being closed at one end and immersible in the fluid material, a portion of the inner surface of said shell member being partially coated with a gettering material;

an insulating pronged base sealing the other end of said tube;

an electron-emissive cathode within said envelope;

an ion-collector electrode within said envelope;

an accelerator grid disposed between said cathode and collector electrode;

and a hydrogen-impermeable covering disposed upon said envelope over a portion of said shell member spaced from said base said covering surrounding said shell member between the base, said covering surrounding said shell member a window area on said envelope and also surrounding said window area for blocking hydrogen permeation through the covered part of said permeable envelope into the interior of said tube, the part of said shell member at said window area being free of said impermeable covering material thereby providing a restricted hydrogen-permeable window in the covering on said envelope and at a position remote from said base whereby a predetermined portion of said envelope is exposed for access of hydrogen-bearing fluid material to said exposed portion of said envelope for hydrogen permeation through said window into said envelope.

2. Apparatus as in claim 1 wherein said envelope is composed of a hydrogen-permeable metal.

3. Apparatus as in claim 1 wherein said covering is a coating of a set hydrogen-impermeable resin.

4. Apparatus as defined in claim 1 wherein said window is on a portion of the outer surface of said shell member opposite a portion of the inner surface which portion is substantially free of gettering material.

5. Apparatus as defined in claim 1 in which said covering material is an epoxy resin.

6. A method of producing a series of hydrogen-testing vacuum tubes having hydrogen permeable shells with outer walls, including:
    coating predetermined proportions of the outer walls of a group of such vacuum tubes with hydrogen-impermeable paint material while leaving windows through said paint coatings to establish predetermined hydrogen permeation characteristics;
    testing such tubes for such characteristics; and
    adjusting the window areas to provide uniform permeation characteristics in all of said group of tubes.

7. In a method of preparing a vacuum tube for use in measuring the hydrogen-effusion properties of a fluid which vacuum tube comprises an envelope that has a hydrogen permeable metallic shell and that includes a plurality of electrodes, the steps that comprise:
    immersing said shell in an electrolytic cleaning solution containing a polarizing electrode while said plurality of electrodes are energized; and
    applying a positive potential to said shell and a negative potential to said polarizing electrode whereby said shell is anodically pickled thereby cleaning the outer surface of said shell.

8. A method of preparing a vacuum tube for use in measuring the hydrogen-effusion properties of a fluid as defined in claim 7 which comprises subsequently rinsing said shell with water; and
    then applying acetone to the water-wet shell for drying said shell.

9. In a method of preparing a vacuum tube for use in measuring the hydrogen-effusion properties of a fluid which vacuum tube comprises an envelope that has a hydrogen permeable metallic shell and that includes a couple of electrodes, the steps that comprise:
    energizing said electrodes to cause an ion current to flow to one of said electrodes in accordance with the pressure of any hydrogen atmosphere present within said envelope;
    immersing said shell in an electrolytic cleaning solution containing a polarizing electrode while said couple of electrodes are energized;
    applying a positive potential to said shell and a negative potential to said polarizing electrode whereby said shell is anodically pickled thereby cleaning the outer surface of said shell;
    subsequently immersing said shell in a calibrating fluid having a predetermined hydrogen-effusion characteristic;
    applying a negative potential to said shell and a positive potential to said polarizing electrode thereby causing hydrogen to permeate said envelope at a predetermined rate; and
    measuring the rate at which ion current flowing between said two electrodes increases as a function of time while said envelope is immersed in said calibrating fluid.

10. The method defined in claim 9 in which said electrolytic cleaning solution comprises a strong acid and in which said calibrating solution comprises an electrolyte selected from the group consisting of weak acids, neutral solutions, and basic electrolytes.

10. The method defined in claim 9 in which said electrolytic cleaning solution comprises a solution of magnesium sulphate and sulphuric acid and in which said calibrating fluid comprises a basic electrolyte.

12. The method as defined in claim 11 in which said basic electrolyte comprises a solution of sodium hydroxide.

13. The method of measuring the hydrogen-effusion properties of a plurality of liquids by means of a vacuum tube having a gettering material within a hydrogen-permeable envelope and including a couple of electrodes within said envelope, the steps that comprise:
    immersing the envelope in each of said liquids thereby causing hydrogen to effuse from each liquid into said envelope whereby the pressure of hydrogen within said envelope increases;
    measuring the rate at which positive ions are collected at one of said electrodes while said envelope is immersed in each of said fluids;
    maintaining said vacuum tube at an elevated temperature between the test made with one fluid and the test made on the next fluid whereby hydrogen gas contained in said envelope is gettered rapidly between the two tests; and
    also electrochemically cleaning the outer surface of the vacuum tube between said tests.

14. The method as defined in claim 13 in which said electrochemical cleaning process comprises the step of anodically pickling said envelope to remove the film deposited on the surface of the envelope in the previous test.

15. The method of measuring the hydrogen-effusion properties of a liquid by means of a vacuum tube having a hydrogen-permeable envelope formed by a shell member of uniform composition over its area, and a base member with external electrical terminal prongs at one end thereof, which shell member is immersible in a fluid and having electrode elements within the shell electrically connected to various prongs, the steps that comprise:
    covering a portion of the external surface of said shell that surrounds a window area on said surface with a hydrogen-impermeable material to define a restricted hydrogen-permeable window on a portion of said envelope spaced from said base member;
    connecting an electrical power source to suitable prongs to energize the electrode elements of said vacuum tube to cause an ion current to flow to one of said electrodes in accordance with the pressure of gas within said envelope;
    immersing the part of said shell bearing said window in a body of fluid under investigation to expose said window to effusion of hydrogen from said fluid;
    simultaneously maintaining the base portion of said tube unexposed to said liquid, whereby the entire area of said window is in contact with said liquid, thereby causing hydrogen effusing from said fluid to permeate said envelope through said window, whereby said ion current changes in accordance with the pressure of hydrogen gas developed within said envelope as a result of such permeation; and
    measuring the change in ion current for indicating the hydrogen-effusion properties of said fluid.

16. The method of measuring the hydrogen-effusion properties of a liquid by means of a vacuum tube having a hydrogen-permeable envelope and including a couple of electrodes, the steps that comprise:
    applying a positive voltage to one of said electrodes relative to the other of said electrodes to cause an ion current to flow to said latter electrode in accordance with the pressure of gas within said envelope;
    maintaining the application of said voltage until the ion current flowing to said latter electrode falls below a predetermined small value;
    electrochemically cleaning the outer surface of said envelope;
    immersing the envelope in a fluid under test at a time when said ion current is below said small value, thereby causing hydrogen effusing from said fluid to permeate said envelope, whereby the pressure of hydrogen atmosphere within said envelope increases; and measuring the rate at which said ion current changes while said envelope is immersed, whereby the rate of permeation of said envelope due to effusion of hydrogen from said liquid may be determined.

17. The method of measuring the hydrogen-effusion properties of a liquid by means of a vacuum tube having a hydrogen-permeable envelope and including an electron-emissive cathode, an accelerator electrode, and a collector electrode, the steps that comprise:

applying a positive voltage to said accelerator electrode relative to said electron-emissive cathode and a negative voltage to said collector electrode relative to said electron-emissive cathode, whereby electrons emitted from said cathode are accelerated to a potential whereby hydrogen gas contained within said envelope is ionized, thereby causing an ion current to flow to said ion collector;

maintaining said potentials until the ion current flowing to said collector falls below a predetermined small value;

electrochemically cleaning the outer surface of said envelope;

immersing the envelope in a fluid under test, at a time when said ion current is below said small value, thereby causing hydrogen effusing from said fluid to permeate said envelope, whereby the pressure of hydrogen atmosphere within said envelope increases; and measuring the rate at which said ion current changes while said envelope is immersed, whereby the rate of permeation of said envelope due to effusion of hydrogen from said fluid may be determined.

18. The method of measuring the hydrogen-effusion properties of a liquid by means of a vacuum tube having a hydrogen-permeable envelope and including a plurality of electrodes, the steps that comprise:

electrically energizing said electrodes, whereby hydrogen gas contained within said envelope is ionized, thereby causing hydrogen ions to flow to one of said electrodes;

immersing said envelope in an electrolytic cleaning solution containing a polarizing electrode;

applying a positive potential to said envelope and a relative negative potential to said polarizing electrode, whereby said shell is anodically pickled, thereby cleaning the outer surface of said envelope;

removing said cleaning solution from said tube;

maintaining the electrodes of said tube energized until said ion current drops below a predetermined small value;

immersing the envelope in a fluid under test while said ion current is below said predetermined value, thereby causing hydrogen effusing from said fluid to permeate said envelope, whereby the pressure of hydrogen atmosphere within said envelope increases; and measuring the rate at which the ion current increases while said envelope is immersed, whereby the rate of permeating of said envelope due to effusion of hydrogen from said fluid may be determined.

19. The method of measuring the hydrogen-effusion properties of a liquid by means of a vacuum tube having a hydrogen-permeable metallic envelope and including an electron-emissive cathode, an accelerator electrode, and a collector electrode, the steps that comprise:

applying a positive voltage to said accelerator electrode relative to said electron-emissive cathode and a negative voltage to said collector electrode relative to said electron-emissive cathode, whereby electrons emitted from said cathode ionized hydrogen gas contained within said envelope, thereby causing hydrogen ions to flow to said ion collector;

maintaining said potentials until the ion current flowing to said collector falls below a predetermined small value;

immersing said envelope in an electrolytic cleaning solution containing a polarizing electrode;

applying a positive potential to said envelope and a negative potential to said polarizing electrode, whereby said envelope is anodically pickled, thereby cleaning the outer surface of said envelope;

subsequently immersing the envelope in a fluid under test, thereby causing hydrogen effusing from said fluid to permeate said envelope, whereby the pressure of hydrogen atmosphere within said envelope increases; and measuring the rate at which the ion current changes during immersion, whereby the rate of permeation of said envelope due to effusion of hydrogen from said fluid may be determined.

20. The method as defined in claim 19 in which said cleaning solution is removed from said envelope prior to immersing the envelope in said fluid under test.

21. In a probe for measuring hydrogen-effusion properties of liquids, the combination that comprises an evacuated sealed envelope that includes a metal wall member permeable to hydrogen said wall member being exposible to a fluid under investigation;

coating material covering a surface of said wall member and surrounding and defining a restricted window portion on said wall member, said coating material being composed of material that is less permeable to hydrogen than is the material of said wall member;

an electron emissive cathode, an emission control grid, an accelerating electrode, and a positive ion collector arranged in said envelope;

biasing means for applying a negative bias to said emission control electrode relative to said cathode;

means for applying a positive potential to said accelerator electrode relative to said cathode whereby electrons are accelerated to a potential above the ionization potential of hydrogen;

a current measuring device connected to said accelerator electrode for measuring the electron current accelerated toward said accelerator electrode;

means for applying a negative potential to said collector electrode relative to said accelerating electrode whereby positive hydrogen ions formed in the space between said accelerator electrode and said collector electrode, are drawn to said collector electrode; and means connected to said collector electrode for measuring the positive ion current flowing thereto.

22. A hydrogen detector probe as defined in claim 21 having a chemical getter within said envelope.

23. A hydrogen detector probe as defined in claim 21 wherein said biasing means includes a continuously adjustable potentiometer for adjusting the electron current flowing toward said accelerator electrode.

24. A hydrogen detector probe as defined in claim 21 including means for adjusting the emission of electron current from said cathode.

25. In a probe for measuring hydrogen-effusion properties of liquids, the combination of an evacuated sealed envelope that comprises a wall member permeable to hydrogen, said wall member being exposible to a fluid under investigation;

coating material covering a portion of the outer surface of said wall member over an area that surrounds and defines a restricted window portion on said wall member, said coating material being composed of material that is less permeable to hydrogen than is the material of said wall member;

an electron emissive cathode, an emission control grid, an accelerating electrode, and a positive ion collector arranged in said envelope;

biasing means for applying a negative bias to said emission control electrode relative to said cathode;

means for applying a negative potential to said collector electrode relative to said accelerating electrode whereby positive hydrogen ions formed in the space between said accelerator electrode and said collector electrode are drawn to said collector electrode;

means for adjustably setting the electron current emitted by said cathode to a predetermined value; and means connected to said collector electrode for measuring the positive ion current flowing thereto.

26. Apparatus for measuring hydrogen-effusion characteristics of a fluid material, including:

a vacuum tube having a hydrogen-permeable envelope formed by a shell member of uniform composition over its area, said shell member being closed at one end and immersible in the fluid material;

an insulating pronged base sealing the other end of said tube;

an electron-emissive cathode within said envelope;

an ion-collector electrode within said envelope;

an accelerator grid disposed between said cathode and collector electrode;

and a hydrogen-impermeable covering disposed upon said envelope over a portion of said shell member spaced from said base and between the base and a window area on said envelope for blocking hydrogen permeation through the covered part of said permeable envelope into the interior of said tube, the part of said shell member at said window area being free of said impermeable covering material thereby providing a restricted hydrogen-permeable window remote from said base whereby a predetermined proportion of said envelope is exposed for access of hydrogen-bearing fluid material to said exposed proportion of said envelope for hydrogen permeation through said window into said envelope;

the interior surface of said shell member is coated with a metal that has a lower hydrogen diffusion constant than the hydrogen diffusion constant of the material that composes said shell member.

27. Apparatus for measuring hydrogen effusion characteristics of a fluid material, including:

a vacuum tube having a hydrogen-permeable shell immersible in the fluid material;

a plurality of electrodes in said shell being sensitive, when electrically energized, to changes in hydrogen pressure within the shell; and a hydrogen impermeable coating sealed upon a predetermined portion of said shell that covers the outer surface of said shell on all sides of a predetermined area defining a window portion of said shell, said window portion being at a position on said shell remote from said electrodes, said coating blocking passage of hydrogen into said shell except through said window portion.

28. Apparatus for measuring hydrogen-effusion characteristics of a fluid material, including:

a vacuum tube having a hydrogen-permeable envelope formed by a shell member of uniform composition over its area, said shell member being closed at one end and immersible in the fluid material;

an insulating pronged base sealing the other end of said tube;

an electron-emissive cathode within said envelope;

an ion-collector electrode within said envelope;

and a hydrogen-impermeable covering disposed upon said envelope over a portion of said shell member, said covering being disposed upon said shell member on all sides of a window area that is spaced from said base, thereby providing a restricted hydrogen-permeable window at said window area, whereby said window area is exposed for access of hydrogen-bearing fluid material when said shell member is immersed in such fluid material, said covering serving to block hydrogen-permeation through said shell member into the interior of said tube except through said window area and said shell member providing for hydrogen-permeation through said window area into said tube when said shell member is so immersed.

References Cited by the Examiner

UNITED STATES PATENTS

| | | | |
|---|---|---|---|
| 2,334,356 | 11/1943 | Salzberg et al. | 324—33 |
| 2,595,611 | 6/1952 | Simpson et al. | 324—33 |
| 2,921,210 | 1/1960 | Schaschl et al. | 324—33 X |

OTHER REFERENCES

Norton, Francis J., Journal of Applied Physics, vol. 11, No. 4, April 1940, pp. 262–267.

WALTER L. CARLSON, *Primary Examiner.*

C. F. ROBERTS, *Assistant Examiner.*